United States Patent
Okada et al.

(10) Patent No.: US 11,125,085 B2
(45) Date of Patent: Sep. 21, 2021

(54) BLADE OF FAN OR COMPRESSOR

(71) Applicant: IHI CORPORATION, Koto-ku (JP)

(72) Inventors: Ryuichi Okada, Koto-ku (JP); Ryosuke Hayashi, Koto-ku (JP); Takeshi Murooka, Koto-ku (JP); Tomonori Enoki, Koto-ku (JP)

(73) Assignee: IHI CORPORATION, Koto-ku (JP)

( * ) Notice: Subject to any disclaimer, the term of this patent is extended or adjusted under 35 U.S.C. 154(b) by 5 days.

(21) Appl. No.: 16/690,187

(22) Filed: Nov. 21, 2019

(65) Prior Publication Data

US 2020/0088039 A1 Mar. 19, 2020

Related U.S. Application Data

(63) Continuation of application No. PCT/JP2017/045802, filed on Dec. 20, 2017.

(30) Foreign Application Priority Data

May 24, 2017 (JP) .............................. JP2017-102826

(51) Int. Cl.
*F01D 5/14* (2006.01)

(52) U.S. Cl.
CPC .......... *F01D 5/141* (2013.01); *F05D 2250/71* (2013.01)

(58) Field of Classification Search
CPC ............................. F01D 5/141; F05D 2250/74
See application file for complete search history.

(56) References Cited

U.S. PATENT DOCUMENTS

| 3,989,406 | A | 11/1976 | Bliss |
| 6,264,429 | B1 | 7/2001 | Koeller et al. |
| 7,056,089 | B2 * | 6/2006 | Sonoda ................... F01D 5/141 |
| | | | 415/181 |

(Continued)

FOREIGN PATENT DOCUMENTS

| JP | 11-13692 | 1/1999 |
| JP | 2002-508043 A | 3/2002 |

(Continued)

OTHER PUBLICATIONS

International Search Report dated Mar. 20, 2018 in PCT/JP2017/045802 filed on Dec. 20, 2017.

(Continued)

*Primary Examiner* — Justin D Seabe
(74) *Attorney, Agent, or Firm* — Oblon, McClelland, Maier & Neustadt, L.L.P.

(57) ABSTRACT

A blade of a fan or compressor that reduces loss by enlarging a laminar flow region over a blade surface is provided. The blade is divided into a subsonic region where the relative Mach number of the inlet air flow during rated operation of a turbofan engine is lower than 0.8 and a transonic region where the relative Mach number is equal to or higher than 0.8. A blade surface angle change rate is based on an angle formed by a tangent to the blade surface and the axis of the engine, the leading edge blade surface angle, and the trailing edge blade surface angle at. In each of the subsonic region and the transonic region, values of the blade surface angle change rate on the pressure and suction surfaces are defined at predetermined axial locations along the chord on the pressure and suction surfaces.

5 Claims, 4 Drawing Sheets

(56) References Cited

U.S. PATENT DOCUMENTS

| | | | |
|---|---|---|---|
| 7,175,393 B2* | 2/2007 | Chandraker | F01D 5/141 416/223 A |
| 10,184,340 B2* | 1/2019 | Baltas | F01D 5/141 |
| 10,480,532 B2* | 11/2019 | Pallot | F04D 29/321 |
| 2005/0271513 A1 | 12/2005 | Johann | |
| 2006/0228206 A1 | 10/2006 | Decker et al. | |
| 2008/0181780 A1 | 7/2008 | Sonoda et al. | |
| 2009/0226322 A1 | 9/2009 | Clemen | |
| 2011/0206527 A1 | 8/2011 | Harvey et al. | |
| 2013/0008170 A1 | 1/2013 | Gallagher et al. | |
| 2017/0097011 A1 | 4/2017 | Pallot et al. | |

FOREIGN PATENT DOCUMENTS

| | | |
|---|---|---|
| JP | 2006-291955 A | 10/2006 |
| JP | 2010-203456 A | 9/2010 |
| JP | 2012-52557 A | 3/2012 |
| JP | 2014-111941 A | 6/2014 |
| WO | WO2016/024461 A1 | 2/2016 |

OTHER PUBLICATIONS

Extended European Search Report issued in European Patent Application No. 17910748.7 dated May 21, 2021.

* cited by examiner

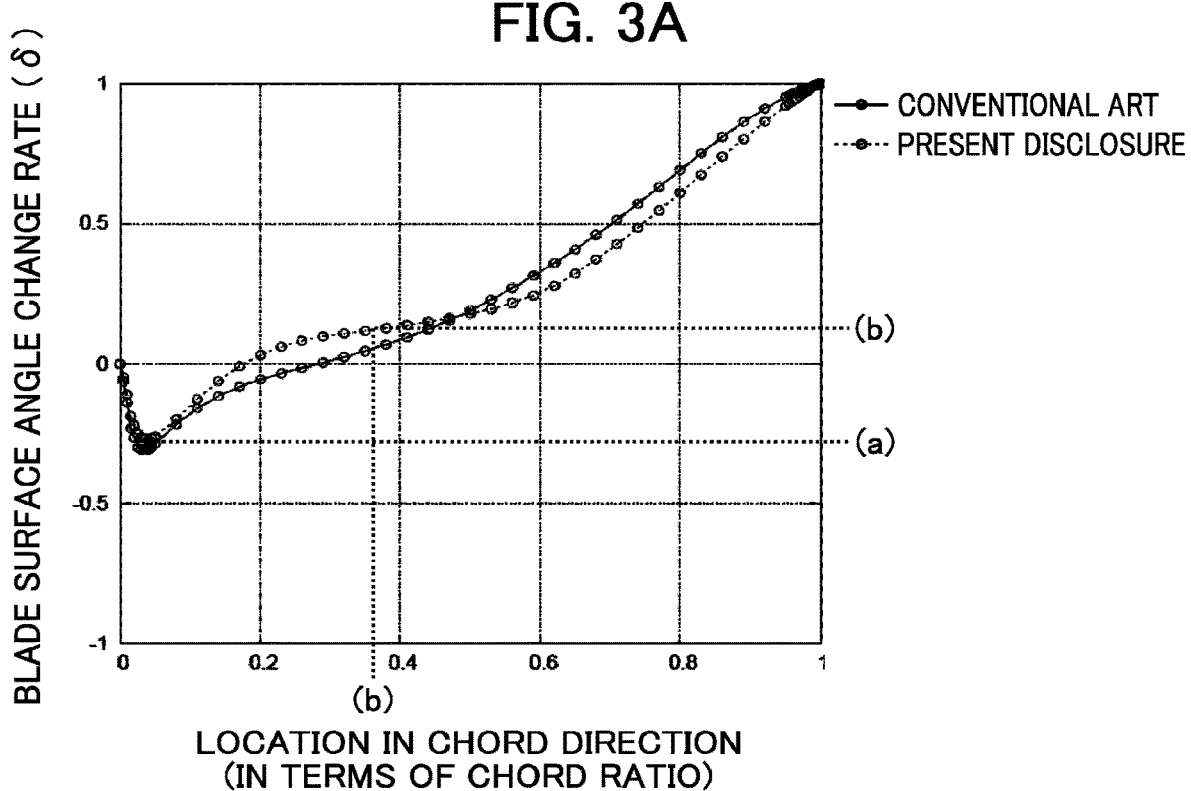
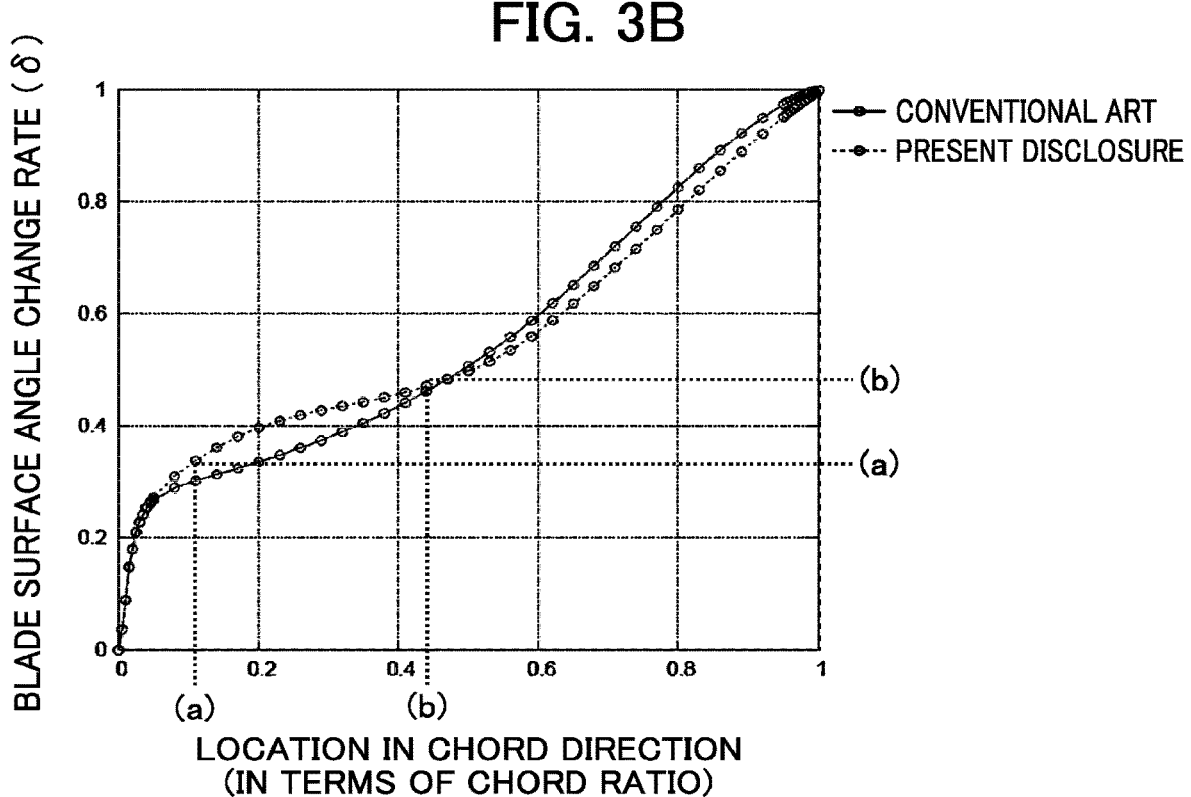

BLADE OF FAN OR COMPRESSOR

TECHNICAL FIELD

The present disclosure relates to a blade of a fan or compressor that is a component of a turbofan engine. In particular, it relates to a blade of a fan or compressor that is reduced in loss by controlling deceleration of a flow around the blade and enlarging a laminar flow region over the blade surface.

BACKGROUND ART

A fan or compressor that is a component of a turbofan engine is provided with a rotor blade and a stator vane. FIG. 4 shows a fan rotor blade as an example of the rotor blade. Note that the terms "radial direction", "circumferential direction" and "axial direction" used in the following description coincide with the radial direction, the circumferential direction and the axial direction of a turbofan engine incorporating the fan rotor blade, respectively.

FIG. 4 is a schematic perspective view of a fan rotor blade RB. The fan rotor blade RB includes a blade part AF and a blade root part RT. The blade part AF is a part that extends in the radial direction in an annular flow channel through which air as a working fluid flows. Such blade parts AF are disposed at regular intervals in the circumferential direction to form a cascade of blades. The blade root part RT is a part formed to be fitted in a groove in an outer surface of a disk (not shown) connected to a rotating shaft when the fan rotor blade RB is attached to the disk.

FIG. 5 is a cross-sectional view taken along the line I-I in FIG. 4, showing the cross-sectional shape, that is, airfoil, of the blade part AF at a position in the span direction (a position in the height direction of the blade part AF). In this drawing, the arrows Z and θ indicate the axial direction and the circumferential direction, respectively.

The airfoil includes a concave pressure surface PS and a convex suction surface SS that extend between a leading edge LE and a trailing edge TE. A line segment connecting the leading edge LE and the trailing edge TE to each other is referred to as a chord. The length of the chord is referred to as a chord length, and the direction along the chord is referred to as a chord direction. Note that the terms "pressure surface" and "suction surface", which originally mean curved surfaces of the blade part, are used to refer to curved lines forming the contour of the airfoil in this specification.

As shown in FIG. 5, the airfoil is curved, and the curve can be regarded as a change in blade surface angle (β) from the leading edge LE to the trailing edge TE.

As shown in FIG. 5, the blade surface angle (β) is an angle formed by a tangent (T) to the blade surface at a point (P) and the axial direction (Z). The blade surface angle at the leading edge LE will be referred to as an inlet blade surface angle ($\beta_{in}$), and the blade surface angle at the trailing edge TE will be referred to as an exit blade surface angle ($\beta_{ex}$). The blade surface angle 3 is defined for each of the pressure surface PS and the suction surface SS. For simplicity, however, FIG. 5 shows only the blade surface angle β at the point P on the suction surface SS.

In general, the inlet blade surface angle $\beta_{in}$ is greater than the exit blade surface angle $\beta_{ex}$, and the blade surface angle β gradually decreases as it goes from the leading edge LE to the trailing edge TE. However, the blade surface angle β of the pressure surface PS first temporarily increases beyond the inlet blade surface angle $\beta_{in}$ in a region near the leading edge LE and then gradually decreases to the trailing edge TE. This is because the pressure surface PS locally curves outward in the region near the leading edge LE.

As a parameter that objectively indicates the way of change of the blade surface angle (or in other words, the degree of the decrease of the blade surface angle from the leading edge LE to the trailing edge TE), a blade surface angle change rate is introduced.

A blade surface angle change rate (δ) is defined by the following formula (1).

$$\delta = (\beta_{in} - \beta)/(\beta_{in} - \beta_{ex}) \qquad \text{formula (1)}$$

As can be seen from the formula (1), the blade surface angle change rate δ is a parameter of the decrease of the blade surface angle β at a point on the blade surface from the blade surface angle at the leading edge LE (the inlet blade surface angle $\beta_{in}$) normalized with the total decrease of the blade surface angle from the leading edge LE to the trailing edge TE (the inlet blade surface angle $\beta_{in}$ minus the exit blade surface angle $\beta_{ex}$), and is 0 at the leading edge LE and 1 at the trailing edge TE. The blade surface angle change rate δ varies with the blade surface angle β described above. On the pressure surface PS, the blade surface angle change rate δ temporarily decreases and assumes negative values as it goes from the leading edge LE (δ=0) to the trailing edge TE, reaches a minimum value, and then monotonically increases as it goes to the trailing edge TE (δ=1). On the suction surface SS, the blade surface angle change rate δ monotonically increases as it goes from the leading edge LE (δ=0) to the trailing edge TE (δ=1).

As can be seen, there is a one-to-one correspondence between the increase of the blade surface angle change rate from the leading edge LE to the trailing edge TE and the decrease of the blade surface angle, and therefore, the sharpness of the decrease of the blade surface angle (or in other words, the magnitude of the curve of the airfoil) can be regarded as the sharpness of the increase of the blade surface angle change rate. In addition, using the blade surface angle change rate allows comparison of the sharpness of the decrease of the blade surface angle between different blades.

Patent Document 1 discloses a blade of a compressor that is reduced in loss by adjusting the curve of the airfoil. With the blade disclosed in the document, provided that the angle formed by a tangent at a point on the camber (center line) of the airfoil and the axial direction is denoted as β', and the same angles at the leading edge and the trailing edge are denoted as $\beta_{in}'$ and $\beta_{ex}'$, respectively, a point on the camber at which the parameter (δ') defined by the following formula (2) equals to 0.5 is arranged within a predetermined range in the chord direction.

$$\delta' = (\beta_{in}' - \beta')/(\beta_{in}' - \beta_{ex}') \qquad \text{formula (2)}$$

RELATED ART DOCUMENT

Patent Document

Patent Document 1: International Publication No. WO 2016/024461

SUMMARY OF THE DISCLOSURE

Problems to be Solved by the Disclosure

An inter-blade flow channel formed between two blade parts located adjacent to each other in the circumferential direction is an expanding flow channel the area of which increases as it goes from the inlet side (upstream side) to the exit side (downstream side) of the blade. Therefore, if the velocity of the air flowing into the inter-blade flow channel is subsonic (Mach number<0.8), the velocity of the flow decreases, that is, the flow decelerates, as the flow channel area increases as the air flows from the inlet side to the exit side of the blade.

In this process, at a location where the flow channel area sharply increases, a rapid deceleration of the air flow occurs, and the boundary layer formed over the blade surface transitions from the laminar state to the turbulent state.

In the laminar boundary layer, the velocity gradient of the air flow near the wall surface is small, so that the shearing stress, that is, the frictional stress, on the wall surface is low. However, in the turbulent boundary layer, the velocity gradient of the air flow near the wall surface is great, so that the frictional stress is high. This means that the larger the region in which the laminar boundary layer is formed (laminar flow region) and the smaller the region in which the turbulent boundary layer is formed (turbulent flow region) on the blade surface, the smaller the frictional drag on the blade becomes, and smaller the friction loss of the inter-blade flow becomes.

Therefore, in designing the airfoil, it is necessary to ensure that the location where the boundary layer transitions from the laminar state to the turbulent state is as downstream as possible in order to make the laminar flow region as large as possible.

With the conventional fan rotor blade, the transition occurs at a relatively upstream location, specifically, a location close to the tip of the blade (in the span direction) on the pressure surface or a location on the tip side of the mid-span on the suction surface. Thus, the boundary layer over the blade surface transitions early (that is, on the upstream side) from the laminar state to the turbulent state, so that the laminar flow region is small, and therefore, the friction loss of the inter-blade flow is high.

Detailed analysis of the velocity distribution of the flow around the conventional fan rotor blade has shown that a rapid deceleration of the flow occurs in a relatively upstream region on both the pressure surface and the suction surface, and the boundary layer transitions in the region.

As described above, it can be considered that the region in which the rapid deceleration of the flow occurs is the region in which the flow channel area of the inter-blade flow channel sharply increases. In this regard, the sharpness of the increase of the flow channel area of the inter-blade channel corresponds to the sharpness of the decrease of the blade surface angle. That is, if the blade surface angle sharply decreases at a location, in a region downstream of that region, the flow channel area of the inter-blade channel sharply increases, so that it is highly likely that the flow sharply decelerates and the transition of the boundary layer from the laminar state to the turbulent state occurs.

As can be seen from the foregoing, if the deceleration of the flow around the blade is appropriately controlled by adjusting the sharpness of the decrease of the blade surface angle and thereby adjusting the sharpness of the increase of the flow channel area of the inter-blade flow channel, the transition of the boundary layer over the blade surface can be delayed (that is, the transition location can be shifted to the downstream side) to enlarge the laminar flow region, and thereby reducing the friction loss of the inter-blade flow.

The present disclosure has been devised based on the above considerations, and an object of the present disclosure is to provide a blade of a fan or compressor that is reduced in loss by appropriately controlling a deceleration of a flow around the blade to delay a transition of a boundary layer over a blade surface (that is, to shift the transition location to the downstream side) to enlarge a laminar flow region over the blade surface.

Means for Solving the Problems

In order to solve the problem described above, a blade according to the present disclosure is a blade used for a fan or compressor that is a component of a turbofan engine, wherein the blade is divided into a subsonic region and a transonic region in a height direction, a relative Mach number of an air flow flowing to the blade during rated operation of the turbofan engine being lower than 0.8 in the subsonic region and equal to or higher than 0.8 in the transonic region, a cross section of the blade at each location in the height direction is formed by a concave pressure surface and a convex suction surface each of which extends between a leading edge and a trailing edge of the blade, and in the cross section, provided that an angle formed by a tangent at a point on the pressure surface or suction surface and an axial direction of the turbofan engine is referred to as a blade surface angle ($\beta$), the blade surface angle at the leading edge is referred to as an inlet blade surface angle ($\beta$in), the blade surface angle at the trailing edge is referred to as an exit blade surface angle ($\beta$ex), a parameter ($\delta$) defined by the formula (1) is referred to as a blade surface angle change rate, a line segment connecting the leading edge and the trailing edge is referred to as a chord, and a parameter (x/c) defined as a distance (x) of a point on the pressure surface or suction surface from the leading edge in the axial direction divided by an axial length (c) of the chord is referred to as a chord ratio, a minimum value of the blade surface angle change rate is equal to or greater than −0.90 and the blade surface angle change rate at a location where the chord ratio is 0.39 is equal to or less than 0.43 in the subsonic region on the pressure surface of the blade, the blade surface angle change rate at a location where the chord ratio is 0.05 is equal to or greater than 0.26 and the blade surface angle change rate at a location where the chord ratio is 0.36 is equal to or less than 0.58 in the subsonic region on the suction surface of the blade, the minimum value of the blade surface angle change rate is equal to or greater than −0.48 and the blade surface angle change rate at a location where the chord ratio is 0.35 is equal to or less than 0.12 in the transonic region on the pressure surface of the blade, and the blade surface angle change rate at a location where the chord ratio is 0.10 is equal to or greater than 0.29 and the blade surface angle change rate at a location where the chord ratio is 0.43 is equal to or less than 0.47 in the transonic region on the suction surface of the blade.

$$\delta=(\beta in-\beta)/(\beta in-\beta ex) \qquad \text{formula (1)}$$

Effects of the Disclosure

The present disclosure provides a beneficial effect that the laminar flow region is enlarged and the friction loss is reduced by delaying the transition of the boundary layer over the blade surface from the laminar state to the turbulent state (that is, shifting the transition location to the downstream side).

BRIEF DESCRIPTION OF THE DRAWINGS

FIG. 3A is a graph showing a distribution in the chord direction of the blade surface angle change rate of the fan rotor blade according to the embodiment of the present disclosure in a transonic region on the pressure surface, for comparison with the conventional fan rotor blade.

FIG. 3B is a graph showing a distribution in the chord direction of the blade surface angle change rate of the fan rotor blade according to the embodiment of the present disclosure in the transonic region on the suction surface, for comparison with the conventional fan rotor blade.

MODE FOR CARRYING OUT THE DISCLOSURE

In the following, an embodiment of the present disclosure will be described in detail with reference to the drawings.

As described above, with the conventional fan rotor blade, a sharp deceleration of the air flow occurs in a relatively upstream region on both the pressure surface and the suction surface. In particular, a sharp deceleration of the air flow occurs in a region where a chord ratio is about 0.05 on the pressure surface, and in a region where the chord ratio is about 0.15 on the suction surface. This means that the blade surface angle sharply decreases or, in other words, the blade surface angle change rate sharply increases in these regions. The chord ratio (x/c), which is a non-dimensional value, is the distance (x) from the leading edge in the axial direction divided by the axial length (c) of the chord.

In view of this, a fan rotor blade according to the embodiment of the present disclosure has an airfoil obtained by modifying the airfoil of the conventional fan rotor blade based on the following principles.

(1) To reduce the deceleration of the air flow in the region where the chord ratio is about 0.05 on the pressure surface, a peak of the blade surface angle change rate appearing in this region is reduced. In other words, the absolute value of a minimum value in this region where the blade surface angle change rate is negative is reduced.

(2) In the region where the chord ratio is about 0.15 on the suction surface, the change of the blade surface angle is reduced in order to reduce the deceleration of the air flow. To this end, the change of the blade surface angle is increased in a region upstream of that region where the chord ratio is about 0.05.

Figure 1:
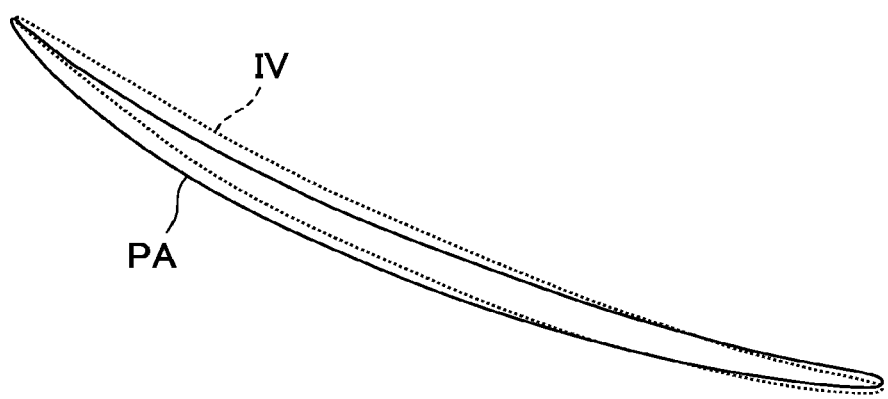
FIG. 1 is a schematic diagram for illustrating a cross-sectional shape (airfoil), at a location in a span direction, of a fan rotor blade according to an embodiment of the present disclosure for comparison with a conventional fan rotor blade.
Figure 2A:
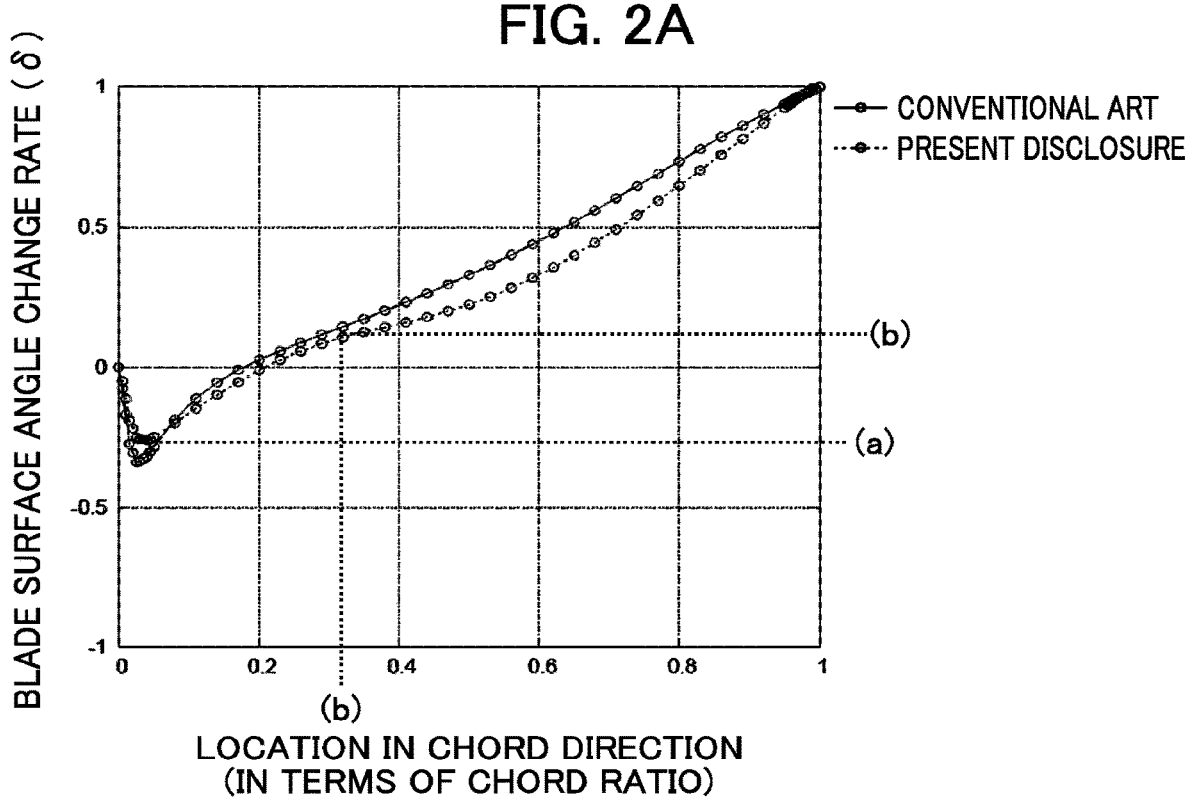
FIG. 2A is a graph showing a distribution in a chord direction of a blade surface angle change rate of the fan rotor blade according to the embodiment of the present disclosure in a subsonic region on a pressure surface, for comparison with the conventional fan rotor blade.
Figure 2B:
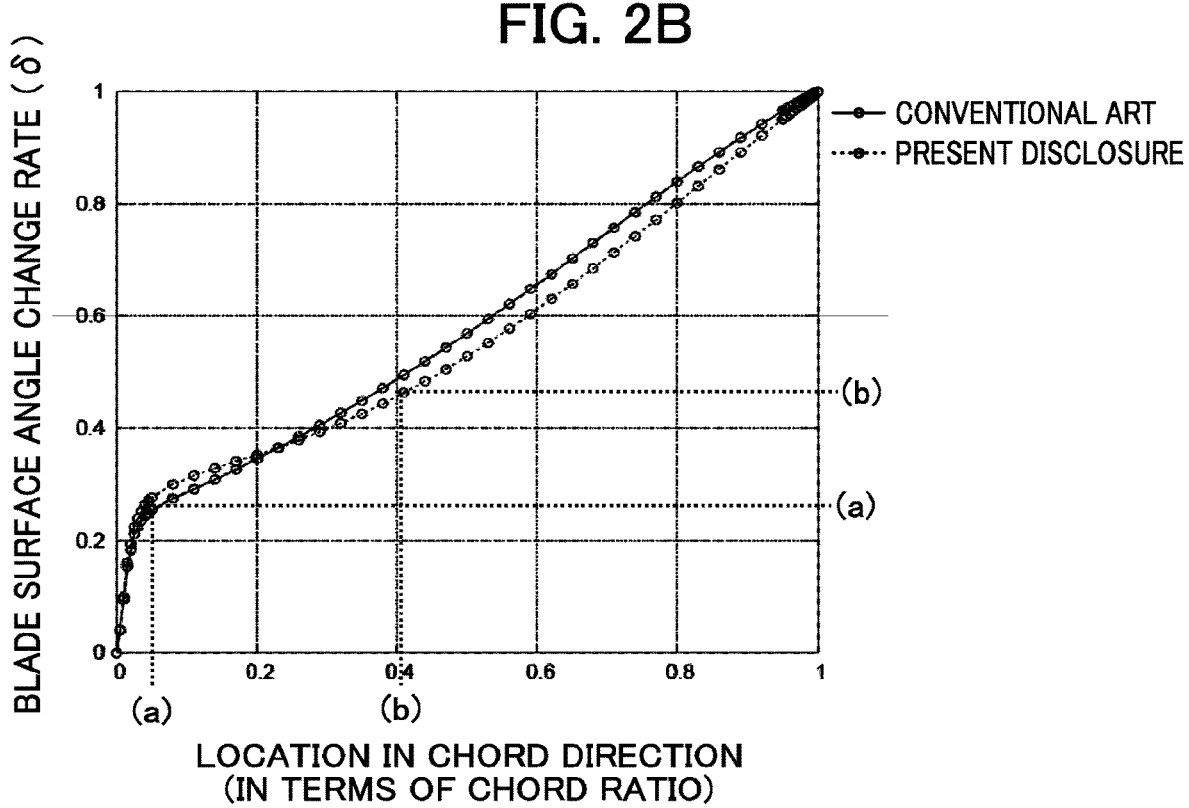
FIG. 2B is a graph showing a distribution in the chord direction of the blade surface angle change rate of the fan rotor blade according to the embodiment of the present disclosure in the subsonic region on a suction surface, for comparison with the conventional fan rotor blade.
Figure 4:
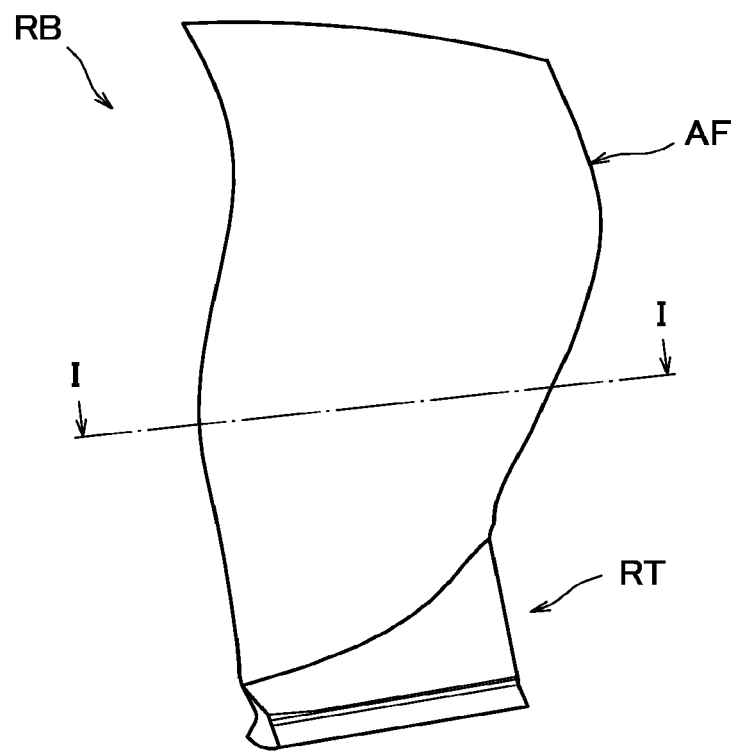
FIG. 4 is a schematic perspective view of a fan rotor blade of a turbofan engine.
Figure 5:
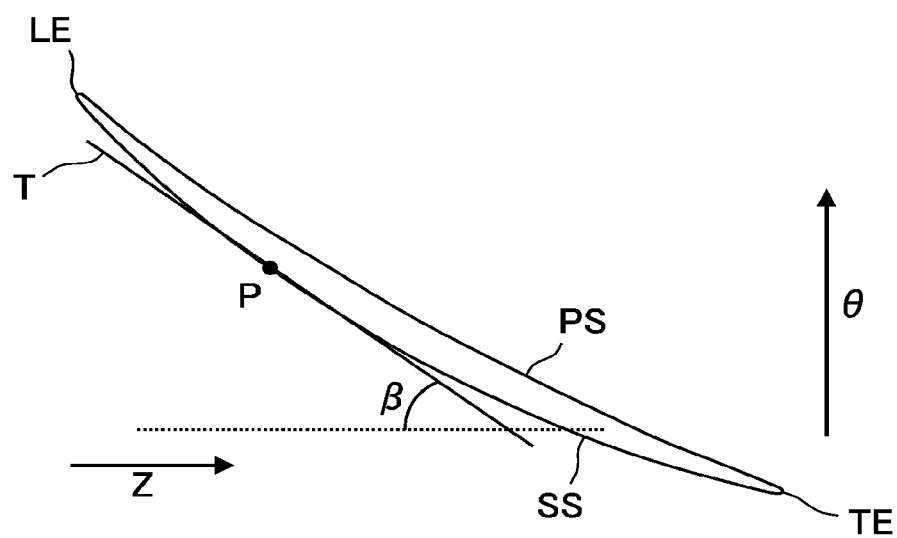
FIG. 5 is a cross-sectional view taken along the line I-I in FIG. 4, showing the cross-sectional shape (airfoil) of the fan rotor blade.

FIG. 1 shows a cross-sectional shape (airfoil), at a location in a span direction, of the fan rotor blade according to the embodiment of the present disclosure provided as described above for comparison with the airfoil of the conventional fan rotor blade. FIGS. 2A to 3B show distributions in the chord direction of the blade surface angle change rate of the fan rotor blade according to the embodiment of the present disclosure for comparison with the conventional fan rotor blade. FIG. 2A shows a distribution in a subsonic region on the pressure surface, FIG. 2B shows a distribution in the subsonic region on the suction surface, FIG. 3A shows a distribution in a transonic region on the pressure surface, and FIG. 3B shows a distribution in the transonic region on the suction surface. In the graphs in these drawings, the vertical axis indicates the blade surface angle change rate, the horizontal axis indicates the location in the chord direction, and the location in the chord direction is indicated in terms of chord ratio.

The term "subsonic region" refers to a range in the span direction where the relative Mach number of the flow of air flowing to the blade during rated operation of the turbofan engine incorporating the fan rotor blade is lower than 0.8, and the term "transonic region" refers to a range in the span direction where the relative Mach number of the flow of air flowing to the blade during rated operation of the turbofan engine incorporating the fan rotor blade is equal to or higher than 0.8. For the rotor blade, the subsonic region is an inner region where the circumferential velocity component added to the flow by the rotation is smaller, and the transonic region is an outer region where the circumferential velocity component added to the flow by the rotation is greater.

As shown in FIGS. 2A to 3B, on the pressure surface (see FIGS. 2A and 3A), the absolute value of the minimum value (negative) of the blade surface angle change rate that appears in the region where the chord ratio is about 0.05 is small, and as a result, a sharp increase of the blade surface angle change rate is suppressed in the region downstream of that region. On the suction surface (see FIGS. 2B and 3B), the blade surface angle change rate significantly increases in the region where the chord ratio is about 0.05, and as a result, a sharp increase of the blade surface angle change rate is suppressed in the region downstream of that region.

As can be seen from the above description, with the fan rotor blade according to the embodiment of the present disclosure, compared with the conventional fan rotor blade, the deceleration of the flow around the blade is appropriately controlled through adjustment of the way of variation of the blade surface angle change rate, and as a result, a location where a boundary layer formed over the blade surface transitions from a laminar state to a turbulent state is shifted to the downstream side as described below. The following are the transition locations (in terms of chord ratio) for the fan rotor blade according to the embodiment of the present disclosure followed by the transition locations (in terms of chord ratio) for the conventional fan rotor blade in parentheses.

Transition location in the subsonic region on the pressure surface: 0.39 (0.27)

Transition location in the subsonic region on the suction surface: 0.36 (0.17)

Transition location in the transonic region on the pressure surface: 0.35 (0.03)

Transition location in the transonic region on the suction surface: 0.43 (0.11)

The following are the blade surface angle change rates at the transition locations for the fan rotor blade according to the embodiment of the present disclosure.

Blade surface angle change rate in the subsonic region on the pressure surface: 0.43

Blade surface angle change rate in the subsonic region on the suction surface: 0.58

Blade surface angle change rate in the transonic region on the pressure surface: 0.12

Blade surface angle change rate in the transonic region on the suction surface: 0.47

It can be considered that the laminar flow region over the blade surface can be enlarged beyond that of the fan rotor blade according to the embodiment of the present disclosure by setting the blade surface angle change rate at each transition location to be equal to or less than the blade surface angle change rate for the fan rotor blade according to the embodiment of the present disclosure. Specifically, conditions for achieving this are as follows (see (b) in the graphs in FIGS. 2A to 3B).

In the subsonic region on the pressure surface, the blade surface angle change rate at the location where the chord ratio is 0.39 is set at 0.43 or less.

In the subsonic region on the suction surface, the blade surface angle change rate at the location where the chord ratio is 0.36 is set at 0.58 or less.

In the transonic region on the pressure surface, the blade surface angle change rate at the location where the chord ratio is 0.35 is set at 0.12 or less.

In the transonic region on the suction surface, the blade surface angle change rate at the location where the chord ratio is 0.43 is set at 0.47 or less.

With regard to the principle (1) concerning the modification of the airfoil described above, it can be considered that a sharp deceleration of the air flow in a region near the leading edge can be suppressed by setting the absolute value of the minimum value of the blade surface angle change rate on the pressure surface to be equal to or less than the same value for the fan rotor blade according to the embodiment of the present disclosure. Specifically, conditions for achieving this are as follows (see (a) in the graphs in FIGS. 2A and 3A).

The minimum value of the blade surface angle change rate in the subsonic region is set to be equal to or greater than −0.90.

The minimum value of the blade surface angle change rate in the transonic region is set to be equal to or greater than −0.48.

Furthermore, with regard to the principle (2) concerning the modification of the airfoil described above, it can be considered that, by setting the blade surface angle change rate in a region near the leading edge on the suction surface to be equal or greater than the same value for the fan rotor blade according to the embodiment of the present disclosure, a sharp increase of the blade surface angle change rage can be suppressed and thus a sharp deceleration of the air flow can be prevented in the region downstream of that region. Specifically, conditions for achieving this are as follows (see (a) in the graphs in FIGS. 2B and 3B).

The blade surface angle change rate at the location where the chord ratio is 0.05 in the subsonic region is set to be equal to or greater than 0.26.

The blade surface angle change rate at the location where the chord ratio is 0.10 in the transonic region is set to be equal to or greater than 0.29.

With the foregoing in mind, the fan rotor blade according to the embodiment of the present disclosure meets the following conditions.

In the subsonic region on the pressure surface, the minimum value of the blade surface angle change rate is equal to or greater than −0.90, and the blade surface angle change rate at the location where the chord ratio is 0.39 is equal to or less than 0.43.

In the subsonic region on the suction surface, the blade surface angle change rate at the location where the chord ratio is 0.05 is equal to or greater than 0.26, and the blade surface angle change rate at the location where the chord ratio is 0.36 is equal to or less than 0.58.

In the transonic region on the pressure surface, the minimum value of the blade surface angle change rate is equal to or greater than −0.48, and the blade surface angle change rate at the location where the chord ratio is 0.35 is equal to or less than 0.12.

In the transonic region on the suction surface, the blade surface angle change rate at the location where the chord ratio is 0.10 is equal to or greater than 0.29, and the blade surface angle change rate at the location where the chord ratio is 0.43 is equal to or less than 0.47.

Although an example where the blade according to the present disclosure is used as a rotor blade of a fan that is a component of a turbofan engine has been described above, the blade according to the present disclosure has a wide variety of applications and can also be used as a rotor blade or stator vane of a compressor of a gas turbine other than the turbofan engine or a fan or compressor as a stand-alone device.

EXPLANATION OF REFERENCE SIGNS

RB fan rotor blade
AF blade part
RT blade root part
PS pressure surface
SS suction surface
LE leading edge
TE trailing edge
$\beta$ blade surface angle
$\delta$ blade surface angle change rate

The invention claimed is:

1. A blade of a fan or compressor that is a component of a turbofan engine, comprising:

a blade part and a blade root, wherein the blade is divided into a subsonic region and a transonic region in a height direction, a relative Mach number of an air flow flowing to the blade during rated operation of the turbofan engine being lower than 0.8 in the subsonic region and equal to or higher than 0.8 in the transonic region, a cross section of the blade at each location in the height direction is formed by a concave pressure surface and a convex suction surface each of which extends between a leading edge and a trailing edge of the blade, and in the cross section, provided that an angle formed by a tangent at a point on the pressure surface or suction surface and an axial direction of the turbofan engine is referred to as a blade surface angle ($\beta$), the blade surface angle at the leading edge is referred to as an inlet blade surface angle ($\beta$in), the blade surface angle at the trailing edge is referred to as an exit blade surface angle ($\beta$ex), a parameter ($\delta$) defined by the formula (1) is referred to as a blade surface angle change rate:

$$\delta = (\beta\text{in} - \beta)/(\beta\text{in} - \beta\text{ex}) \qquad \text{formula (1)}$$

a segment connecting the leading edge and the trailing edge is referred to as a chord, and a parameter (x/c) defined as a distance (x) of a point on the pressure surface or suction surface from the leading edge in the axial direction divided by an axial length (c) of the chord is referred to as a chord ratio, a minimum value of the blade surface angle change rate is equal to or greater than −0.90 and the blade surface angle change rate at a first transition location where the chord ratio is 0.39 is equal to or less than 0.43 in the subsonic region on the pressure surface of the blade, the first transition location being a location where a boundary layer formed over the pressure surface of the blade in the subsonic region transitions from a laminar state to a turbulent state, the blade surface angle change rate at a location where the chord ratio is 0.05 is equal to or greater than 0.26 and the blade surface angle change rate at a second transition location where the chord ratio is 0.36 is equal to or less than 0.58 in the subsonic region on the suction surface of the blade, the second transition location being a location where a boundary layer formed over the suction surface of the blade in the subsonic region transitions from a laminar state to a turbulent state, the minimum value of the blade surface angle change rate is equal to or greater than −0.48 and the blade surface angle change rate at a third transition location where the chord ratio is 0.35 is equal to or less than 0.12 in the transonic region on the pressure surface of the blade, the third transition location being a location where a boundary layer formed over the pressure surface of the blade in the transonic region transitions from a laminar state to a turbulent state, and the blade surface angle change rate at a location where the chord ratio is 0.10 is equal to or greater than 0.29 and the blade surface angle change rate at a fourth transition location where the chord ratio is 0.43 is equal to or less than 0.47 in the transonic region on the suction surface of the blade, the fourth transition location being a location where a boundary layer formed over the suction surface of the blade in the transonic region transitions from a laminar state to a turbulent state.

2. The blade according to claim 1, wherein the blade surface angle change rate at the first transition location where the chord ratio is 0.39 is equal to 0.43 in the subsonic region on the pressure surface of the blade.

3. The blade according to claim 1, wherein the blade surface angle change rate at the second transition location where the chord ratio is 0.36 is equal to 0.58 in the subsonic region on the suction surface of the blade.

4. The blade according to claim 1, wherein the blade surface angle change rate at the third transition location where the chord ratio is 0.35 is equal to 0.12 in the transonic region on the pressure surface of the blade.

5. The blade according to claim 1, wherein the blade surface angle change rate at the fourth transition location where the chord ratio is 0.43 is equal to 0.47 in the transonic region on the suction surface of the blade.

* * * * *